J. F. MARSOLAIS.
TOOL HOLDER.
APPLICATION FILED APR. 8, 1916.
1,215,830.
Patented Feb. 13, 1917.
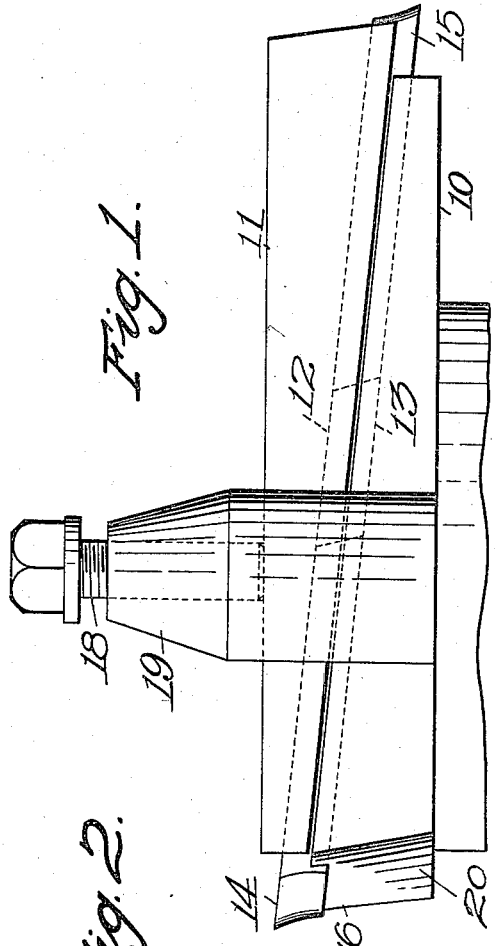
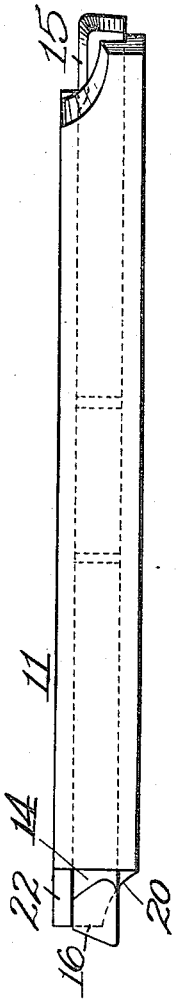
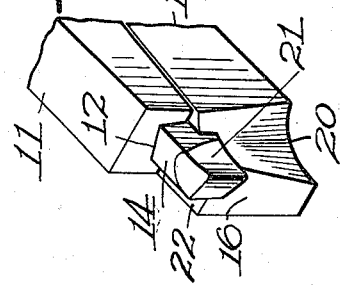
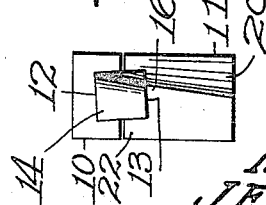
Inventor
J. F. Marsolais.
By Attorneys

UNITED STATES PATENT OFFICE.

JOSEPH F. MARSOLAIS, OF FRAMINGHAM, MASSACHUSETTS, ASSIGNOR TO WORCESTER FLEXIBLE TUBING COMPANY, OF WORCESTER, MASSACHUSETTS, A CORPORATION OF MASSACHUSETTS.

TOOL-HOLDER.

1,215,830.  Specification of Letters Patent.  Patented Feb. 13, 1917.

Application filed April 8, 1916. Serial No. 89,983.

*To all whom it may concern:*

Be it known that I, JOSEPH F. MARSOLAIS, a citizen of the United States, residing at Framingham, in the county of Middlesex and State of Massachusetts, have invented a new and useful Tool-Holder, of which the following is a specification.

This invention relates to a tool holder for use on lathes and other kinds of machine tools but it is capable of general use, and is particularly adapted for heavy work.

The principal objects of the invention are to provide a tool holder which will necessarily hold the tool in such position that the top surface thereof will be at the proper angle to the horizontal in order to provide the most efficient cut and thus avoid the necessity of extreme accuracy in the grinding of the tool; to provide a device of this character so that a tool of a definite shape, as for example a square tool, will be held in exactly the proper position for efficient work without the necessity for the operator using any judgment in the matter and will be supported clear out to the cutting point; to provide an improved form of supporting and clamping members having means for receiving the tool and effectively clamping it in position therebetween so that it will not chatter when taking a heavy chip; and to provide a construction in which a tool can be held at each end of the holder so that one can be used for left-hand work and the other for right-hand. The invention also involves improvements in details of construction as will appear.

Reference is to be had in the accompanying drawings in which—

Figure 1 is a side elevation of a preferred embodiment of this invention showing two tools held in position in the tool holder;

Fig. 2 is a perspective view of one end thereof;

Fig. 3 is a plan, and

Fig. 4 is an end elevation.

It is a well known fact that a tool for use on a lathe or other machine tool requires to be sharpened to a definite transverse angle on the top surface in order to secure an efficient cut, but that the angle on the vertical wall toward the work is not so important as long as it slants away from the work and a considerable variation in the slant can be had without interfering with the efficiency of the cut. Therefore it is obvious that it requires a skilled workman to keep these tools in order and considerable time is required for this purpose, but on the other hand it does not require a workman of the same degree of skill to operate the machine on which the tool is used. One of the important features of this invention is the provision of means whereby the tool cannot be brought up to the work in any except its most efficient angle for operation.

For this purpose the invention is preferably carried out as shown in the accompanying drawings in which 10 designates a support and 11 a corresponding member which, for the present purposes, may be considered as a clamping plate. It will be noted that these parts are of a general triangular shape in side view, the top of the member 10 and the bottom of the member 11 meeting each other at an inclination so that the bottom of the member 10 and the top of the member 11 are parallel and preferably horizontal when in use. The top of the supporting member 10 is provided with a groove 12 and the bottom of the clamping member 11 with a corresponding groove 13. These grooves preferably extend throughout the length of the members parallel with them and are inclined to the same degree as the line between the two members. The two grooves, in the present instance, are shown as of rectangular form, each one half as high as it is wide. Consequently the passage formed by these two grooves when the parts are assembled, is square in cross section to provide for square tools 14 and 15 which are to be clamped in them. It will be understood of course that the grooves may be made of different forms to suit the desired tools, but this is the most convenient one.

It will be observed especially that this square passage formed by these two grooves is tilted over slightly, preferably so that its top and bottom surfaces make an angle with the horizontal transversely of about 6 degrees. This is for the purpose of necessitating that the tool shall be always in a position in which its top surface makes a transverse angle with the horizontal of that number of degrees and to provide that it shall necessarily be in position to make a cut with a maximum efficiency. It will be understood of course that if a tool of any kind of steel is employed which requires a different angle, the angle will be changed accordingly within the principle of this invention.

It will be observed also that the end of the lower member 10 projects beyond the end of the upper member and the groove also, so as to form a projecting ledge 16 for supporting the working point of the tool against which ledge the tool is effectively clamped by a screw as 18 in a tool holder 19. This is for the purpose of preventing chattering on heavy work.

It will also be noted that the end of the supporting member 10 at one corner is rounded out at 20 or cut away and slanted so as to form when assembled, what is really a continuation of the slanting surface 21 from the cutting edge of the tool. When the tool is to be ground it is this surface that is ground off and the top surface is not touched except to keep it smooth. Therefore any ordinary workman can perform this operation, because it is not essential that this surface 21 be exactly at a definite inclination.

It will also be noted that if this whole device is inverted and turned end for end the other tool 15 will be brought into position exactly like the first named tool with all the conditions the same except that it is arranged to cut on the opposite side of the work. In that way, with a single pair of members constituting a tool holder, I provide for right and left hand cutting, both of the tools necessarily always being in proper position for securing the maximum efficiency.

Also the tool is supported along its entire length, insuring it against breakage on account of strain on the tool itself; small pieces of high speed steel can be used up that could not be held in other holders; there are no set screws to wear on or break the tool; a man can work near the cutting edge, directly over the carriage, thereby reducing strain by overhang; the side support on the back of the tool at 22 helps to reduce chattering; the top shoulder acts as a chip breaker; and no fastening devices have to be used except the tool port binding screw.

Although I have illustrated and described only a single embodiment of the invention and shown it as used only in a single way, yet I am well aware of the fact that modifications can be made therein by any person skilled in the art, and that my invention can be used in other machines than lathes without departing from the scope of the invention as set forth in the claims. Therefore I do not wish to be limited in these respects, but what I do claim is—

1. In a tool holder, the combination of a support having a groove in its top surface adapted to fit the bottom of a tool, a clamping plate located above the same and also having a groove in its bottom surface fitting the top of the tool, said grooves being arranged to hold the tool with its cutting edge higher than its rear edge, and a square tool therefor having cutting edges on its ends, one located on the top and the other on the bottom.

2. In a tool holder for use on a lathe, the combination with a cutting tool rectangular in cross section, of a support having a groove in its upper surface for receiving the tool, a clamping plate having a groove in its lower surface, the combined cross sections of said grooves being of square form, the upper surface of said plate being parallel with the lower surface of the support, the square passage formed by said grooves being tilted over slightly to bring the cutting edge of the tool to position higher than its rear edge.

In testimony whereof I have hereunto set my hand.

JOSEPH F. MARSOLAIS.

Copies of this patent may be obtained for five cents each, by addressing the "Commissioner of Patents, Washington, D. C."